United States Patent
Fan (10) Patent No.: US 11,755,452 B2
(45) Date of Patent: Sep. 12, 2023

(54) LOG DATA COLLECTION METHOD BASED ON LOG DATA GENERATED BY CONTAINER IN APPLICATION CONTAINER ENVIRONMENT, LOG DATA COLLECTION DEVICE, STORAGE MEDIUM, AND LOG DATA COLLECTION SYSTEM

(71) Applicant: BOE TECHNOLOGY GROUP CO., LTD., Beijing (CN)

(72) Inventor: Lin Fan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 522 days.

(21) Appl. No.: 16/963,618

(22) PCT Filed: Jun. 28, 2019

(86) PCT No.: PCT/CN2019/093854
§ 371 (c)(1),
(2) Date: Jul. 21, 2020

(87) PCT Pub. No.: WO2020/258290
PCT Pub. Date: Dec. 30, 2020

(65) Prior Publication Data
US 2022/0004480 A1  Jan. 6, 2022

(51) Int. Cl.
| G06F 12/00 | (2006.01) |
| G06F 11/34 | (2006.01) |
| G06F 16/182 | (2019.01) |
| G06F 40/20 | (2020.01) |

(Continued)

(52) U.S. Cl.
CPC ...... *G06F 11/3476* (2013.01); *G06F 11/3006* (2013.01); *G06F 12/0888* (2013.01); *G06F 16/182* (2019.01); *G06F 40/20* (2020.01)

(58) Field of Classification Search
CPC ............ G06F 11/3476; G06F 11/3006; G06F 12/0888; G06F 16/182; G06F 40/20; G06F 3/061; G06F 3/0619; G06F 3/0656; G06F 3/067; G06F 2212/163; G06F 9/45558;
(Continued)

(56) References Cited

U.S. PATENT DOCUMENTS

| 7,480,672 B2 | 1/2009 | Hahn et al. |
| 2015/0186050 A1* | 7/2015 | Aral ...................... G06F 3/0608 709/216 |

FOREIGN PATENT DOCUMENTS

| CN | 1642104 A | 7/2005 |
| CN | 107239382 A | * 10/2017 |
| CN | 109063025 A | * 12/2018 |

(Continued)

OTHER PUBLICATIONS

CHINA Office Action from Chinese Patent Application No. 201980000951X dated Sep. 30, 2022.

*Primary Examiner* — Mardochee Chery
(74) *Attorney, Agent, or Firm* — Dilworth & Barrese, LLP.; Michael J. Musella, Esq.

(57) ABSTRACT

A log data collection method, a log data collection device, a storage medium, and a log data collection system are provided. The log data collection method includes: acquiring log data generated by at least one container in an application container environment; transmitting the log data to a log cache unit for cache; and allowing a log collection unit to collect the log data cached in the log cache unit and transmit the log data to a log storage unit for storage.

18 Claims, 7 Drawing Sheets

(51) Int. Cl.
*G06F 11/30* (2006.01)
*G06F 12/0888* (2016.01)

(58) Field of Classification Search
CPC .... G06F 11/302; G06F 12/0868; G06F 17/40;
G06F 2009/45591; G06F 16/1734
USPC ........................................................ 711/126
See application file for complete search history.

(56) References Cited

FOREIGN PATENT DOCUMENTS

| | | | |
|---|---|---|---|
| CN | 109274556 A | | 1/2019 |
| CN | 109284251 A | | 1/2019 |
| CN | 109308329 A | | 2/2019 |
| CN | 109491859 A | | 3/2019 |
| CN | 109818934 A | | 5/2019 |
| CN | 110111084 | * | 8/2019 |
| KR | 20190066516 A | | 6/2019 |

* cited by examiner

LOG DATA COLLECTION METHOD BASED ON LOG DATA GENERATED BY CONTAINER IN APPLICATION CONTAINER ENVIRONMENT, LOG DATA COLLECTION DEVICE, STORAGE MEDIUM, AND LOG DATA COLLECTION SYSTEM

TECHNICAL FIELD

Embodiments of the present disclosure relate to a log data collection method, a log data collection device, a storage medium, and a log data collection system.

BACKGROUND

Docker is an open source application container engine that allows developers to package their applications and package these applications into a portable container and then publish to any popular Linux or Windows machine, and can also realize virtualization. The containers adopt sandbox mechanism. Moreover, there will be no interface between the containers, and the containers are independent of each other.

SUMMARY

At least one embodiment of the present disclosure provides a log data collection method, and the log data collection method comprises: acquiring log data generated by at least one container in an application container environment; transmitting the log data to a log cache unit for cache; and allowing a log collection unit to collect the log data cached in the log cache unit and transmit the log data to a log storage unit for storage.

For example, in the log data collection method provided by at least one embodiment of the present disclosure, the log cache unit comprises a message queue component; the log collection unit comprises a data stream migration component; and the log data collection method comprises: transmitting the log data to the message queue component for cache; and allowing the data stream migration component to collect the log data cached in the message queue component and transmit the log data to the log storage unit for storage.

For example, in the log data collection method provided by at least one embodiment of the present disclosure, transmitting the log data to the log cache unit for cache, comprises: respectively sending log data of different log types to different message queues in the message queue component for cache according to log types of the log data.

For example, in the log data collection method provided by at least one embodiment of the present disclosure, allowing the log collection unit to collect the log data cached in the log cache unit, comprises: allowing the log collection unit to read the log data cached in the different message queues one by one, so as to collect the log data cached in the log cache unit.

For example, in the log data collection method provided by at least one embodiment of the present disclosure, the log data comprises error level log data, warn level log data, and info level log data.

For example, in the log data collection method provided by at least one embodiment of the present disclosure, the log data is transmitted to the log storage unit for storage based on system time and in accordance with a first time range.

For example, in the log data collection method provided by at least one embodiment of the present disclosure, the log storage unit comprises a distributed file system; and transmitting the log data to the log storage unit for storage, comprises: transmitting the log data collected by the log collection unit to the distributed file system for distributed storage.

For example, the log data collection method provided by at least one embodiment of the present disclosure further comprises: performing data processing on the log data stored into the log storage unit.

For example, the log data collection method provided by at least one embodiment of the present disclosure further comprises: determining a data range of the log data, in which data processing is required to be performed, by adoption of a time slice as a filter condition; and determining whether the log data within the data range is compliant, if so, performing structured collection on the log data, and outputting the log data to an object file with the time slice for storage.

For example, in the log data collection method provided by at least one embodiment of the present disclosure, determining whether the log data within the data range is compliant, comprises: reading log data of at least one data range one by one in a distributed manner, so as to determine whether the log data in the at least one data range is compliant.

For example, in the log data collection method provided by at least one embodiment of the present disclosure, the log data is log data generated by an intelligent question and answer (Q&A) system.

For example, in the log data collection method provided by at least one embodiment of the present disclosure, types of the log data comprises a first type log data and a second type log data; the first type log data is sent to a first message queue in the message queue component for cache; and the second type log data is sent to a second message queue in the message queue component for cache; and the first message queue is different from the second message queue.

For example, in the log data collection method provided by at least one embodiment of the present disclosure, the first type log data is log data generated based on a general type Q&A; and the second type log data is log data generated based on an art type Q&A.

For example, in the log data collection method provided by at least one embodiment of the present disclosure, the application container environment comprises the at least one container; the intelligent Q&A system comprises a natural language understanding (NLU) subsystem; the NLU subsystem runs on the at least one container of the application container environment and generates the log data; and the at least one container outputs the log data in response to a business request.

For example, in the log data collection method provided by at least one embodiment of the present disclosure, the application container environment comprises a plurality of containers, and different business modules of the NLU subsystem runs in different containers.

For example, in the log data collection method provided by at least one embodiment of the present disclosure, the application container environment is implemented through a docker container engine.

At least one embodiment of the present disclosure further provides a log data collection device, and the log data collection device comprises: a log acquisition unit configured to acquire log data generated by at least one container in an application container environment; a log cache unit configured to cache the log data; a log collection unit configured to collect the log data cached in the log cache unit and transmit the log data; and a log storage unit configured to store the log data.

For example, in the log data collection device provided by at least one embodiment of the present disclosure, the log cache unit comprises a message queue component; the log collection unit comprises a data stream migration component; and the log storage unit comprises a distributed file system.

At least one embodiment of the present disclosure further provides a log data collection device comprising: a processor; and a memory configured to store one or more computer program modules, the one or more computer program modules are configured to be executed by the processor and comprise instructions used for executing the log data collection method provided by any one of embodiments of the present disclosure.

At least one embodiment of the present disclosure further provides a storage medium used for non-transitory storage of computer readable instructions, the log data collection method provided by any one of embodiments of the present disclosure can be executed in a case where the computer readable instructions are executed by a computer.

At least one embodiment of the present disclosure further provides a log data collection system, comprising a terminal device and a server, the terminal device is configured to receive audio or text information and send the audio or text information to the server; and the server is configured to receive the audio or text information sent by the terminal device, generate log data, and collect the log data based on the log data collection method provided by any one of embodiments of the present disclosure.

For example, in the log data collection system provided by at least one embodiment of the present disclosure, the terminal device comprises an electronic picture frame.

For example, in the log data collection system provided by at least one embodiment of the present disclosure, the audio or text information comprises general type audio or text information and art type audio or text information; the server comprises a general type application container, an art type application container, a message queue component, a data stream migration component, and a distributed file system; the general type application container is configured to output general type log data in response to the general type audio or text information; the art type application container is configured to output art type log data in response to the art type audio or text information; the message queue component is configured to cache the general type log data and the art type log data; the data stream migration component is configured to collect and transmit the general type log data and the art type log data cached in the message queue component; and the distributed file system configured to store the general type log data and the art type log data.

For example, in the log data collection system provided by at least one embodiment of the present disclosure, the message queue component comprises a message queue of a general type topic and a message queue of an art type topic; and the general type log data is cached in the message queue of the general type topic, and the art type log data is cached in the message queue of the art type topic.

For example, in the log data collection system provided by at least one embodiment of the present disclosure, the server is configured to determine whether the general type log data and the art type log data stored on the distributed file system are compliant according to a first principle.

BRIEF DESCRIPTION OF THE DRAWINGS

In order to clearly illustrate the technical solutions of the embodiments of the present disclosure, the drawings of the embodiments will be briefly described in the following; and it is obvious that the described drawings are only related to some embodiments of the present disclosure and thus are not limitative to the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "comprise," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the position of the object which is described is changed, the relative position relationship may be changed accordingly.

The present disclosure will be described below through several specific embodiments. In order to keep the following descriptions of the embodiments of the present disclosure clear and concise, detailed descriptions of known functions and known components are omitted. In the case where any component of an embodiment of the present disclosure appears in more than one drawing, the component is denoted by the same reference numeral in each drawing.

Applications deployed in containers can run automatically. During application development, it is necessary to continuously perform development, deployment, and testing, and compiling and packaging codes into a docker image is the basis of application deployment, release, and operation and maintenance management. Moreover, a system can easily generate different containers according to different images to meet different business needs, and can easily recycle the containers after corresponding business needs disappear. Therefore, scalable architecture can be easily implemented through the application container engine.

An intelligent question and answer (Q&A) system based on, for example, a docker environment is running in a highly concurrent environment. Using a scalable application container environment can respond to highly concurrent business requests, but also generates a large amount of log data. At the same time, in a highly concurrent environment, as multiple docker containers run independently of each other, online data production is fast and sudden, so the log data may not be completely saved due to the limitation of the container environment to read and write files. For example, in the case where the data generated in the multiple docker containers are simultaneously stored in, for example, a fast drag machine, in the form of file, there will be a phenomenon of contention for storage resources, so it may cause the log data write failure during the peak time of log data generation, thereby causing incomplete data storage or trouble reading.

At least one embodiment of the present disclosure provides a log data collection method, comprising: acquiring log data generated by at least one container in an application container environment; transmitting the log data to a log cache unit for cache; and allowing a log collection unit to collect the log data cached in the log cache unit and transmit the log data to a log storage unit for storage.

At least one embodiment of the present disclosure also provides a log data collection device, a storage medium, and a log data collection system corresponding to the above log data collection method.

The log data collection method provided by the above embodiment of the present disclosure can solve the problem of the incomplete storage of log data generated in the application container environment, thereby broadening the application environment of the application container and improving the market competitiveness.

Detailed description will be given below to the embodiments of the present disclosure and some examples thereof with reference to the accompanying drawings.

Figure 1:
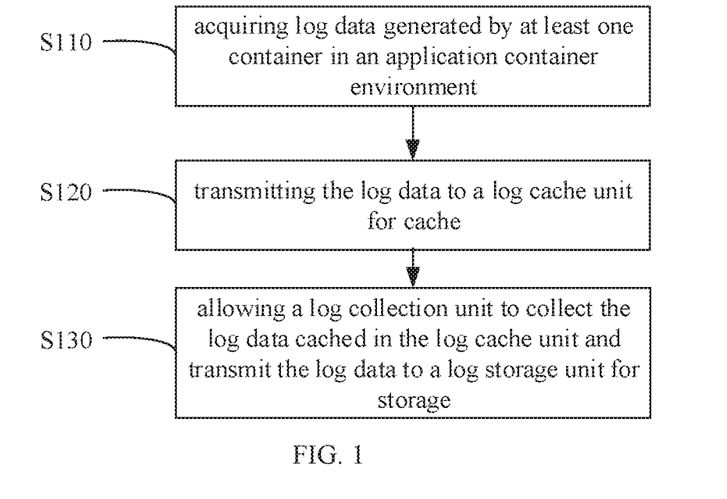
FIG. 1 is a flowchart of a log data collection method provided by at least one embodiment of the present disclosure.

FIG. 1 is a flowchart of a log data collection method provided by at least one embodiment of the present disclosure. For instance, the log data collection method can be applied to various systems running based on the application container environment, such as an intelligent Q&A system, etc., and of course, the method can also be applied to various systems in other operating environments. No limitation will be given here in the embodiment of the present disclosure. The log data collection method can be implemented in the form of software, and is loaded and executed by a processor in the intelligent Q&A system, for example, is loaded and executed by a central processing unit (CPU); or at least one part is implemented in the form of software, hardware, firmware or any combination thereof. The method can solve the problem of the incomplete storage of log data generated in a highly concurrent environment, widen the application field of the application container environment, and improve the market competitiveness.

Description will be given below to the log data collection method provided by at least one embodiment of the present disclosure with reference to FIG. 1. As shown in FIG. 1, the log data collection method comprises steps S110 to S130. Description will be given below to the steps S110 to S130 of the log data collection method and respective illustrative implementations respectively.

S110: acquiring log data generated by at least one container in an application container environment.

S120: transmitting the log data to a log cache unit for cache.

S130: allowing a log collection unit to collect the log data cached in the log cache unit and transmit the log data to a log storage unit for storage.

For instance, the log cache unit and the log collection unit mentioned in the above steps can be implemented in the form of a hardware (such as circuit) module, a software module, or any combination thereof. For instance, the log cache unit and the log collection unit can be implemented through a central process unit (CPU), a graphics processing unit (GPU), a tensor processing unit (TPU), a field programmable logic gate array (FPGA) or processing units in other forms having data processing capability and/or instruction execution capability and corresponding computer instructions. For instance, the processing unit may be a general-purpose processor or a dedicated processor, and can be a processor based on X86 or ARM architecture, etc.

As for the step S110, for instance, in some embodiments of the present disclosure, the application container environment is implemented through a docker container engine, and correspondingly, the application container is, for example, a docker container. For instance, multiple docker containers are independent of each other. In the case where an amount of businesses (for example, intelligent Q&A businesses) increases, an amount of the docker containers can be correspondingly increased, so as to improve the processing efficiency of the docker containers. No limitation will be given here in the embodiment of the present disclosure.

For instance, each docker container may be seen as an independent host machine. During the creation of the docker container, an image is usually taken as a template. Analogous the host to a virtual machine, it can be understood that the image is an image of the virtual machine and the docker container is a running virtual machine. For instance, what software is in the docker container after the docker container is created depends entirely on the image that the docker container uses. The image can be created through the docker container (equivalent to saving the state of the docker container at this time as a snapshot) and can also be created through Dockerfile (a text file with some rules specified by docker). Registry is a place to centrally store image files; each registry may container multiple images; and each image has different tags. The registry is divided into public registry and private registry. A maximum public registry is Docker Hub that stores a large number of images for users to download. The creation, storage and the like of the image are not limited in the embodiment of the present disclosure.

Description will be given below by taking the case that the docker container is applied to the intelligent Q&A system as an example. Correspondingly, the log data is log data generated by the intelligent Q&A system running based on the docker container environment. No limitation will be given here in the embodiment of the present disclosure.

For instance, the application container environment includes at least one container, and an NLU subsystem (for example, a Q&A subsystem, a dialogue subsystem, etc.) in the intelligent Q&A system runs on the at least one container of the application container environment and generates log data. For instance, the at least one container outputs the log data in response to business requests.

For instance, in some examples, the application container environment includes a plurality of containers, and different business modules (for example, a first type business module (such as a general type business module), a second type business module (such as an art type business module)) of the NLU subsystem run in different containers to realize the response to different business requests, so as to output different types of log data.

Figure 3:
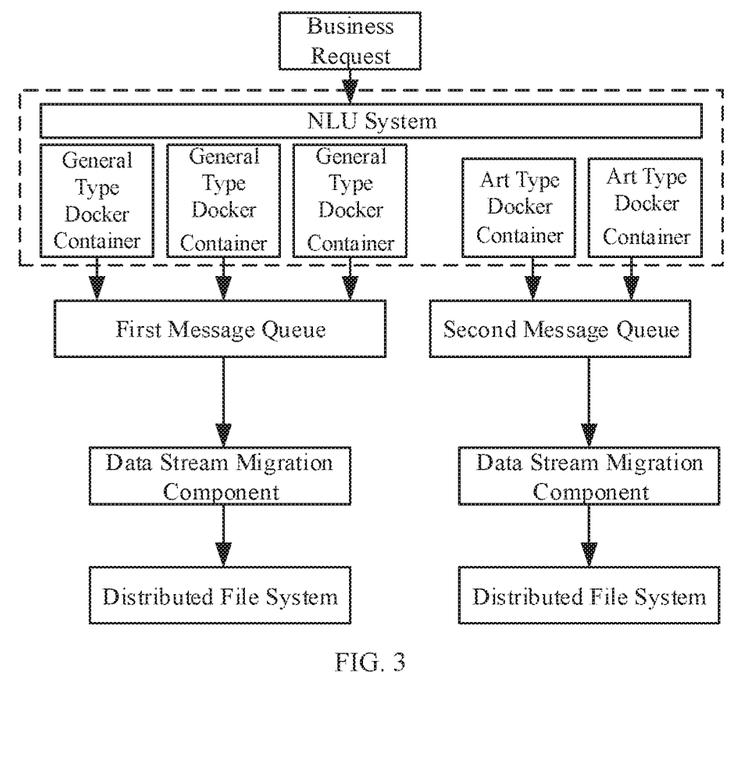
FIG. 3 is a schematic block diagram of a log data collection method provided by at least one embodiment of the present disclosure.

For instance, as shown in FIG. 3, the general type business module of the NLU subsystem processes general type business requests (for example, common words, such as weather Q&A and time Q&A, in daily life), and runs in a first type docker container (for example, a general type docker container); and the art type business module of the NLU subsystem processes art type business requests (for example, who painted the painting and so on), and runs in a second type docker container (for example, an art type docker container).

For instance, the types of the log data includes a first type log data (such as general type log data) and a second type log data (such as art type log data). For instance, the general type log data, for example, includes log data generated in response to the business requests, such as weather Q&A, time Q&A, and the like, namely the log data generated by the general type docker containers; and the art type log data, for example, includes log data generated in response to the business requests, such as painting Q&A and the like, namely the log data generated by the art type docker containers. No limitation will be given here in the embodiment of the present disclosure. It should be noted that the type of the log data may also include inference type log data or more other types of log data. For instance, the inference type log data may be log data generated in the process of determining and processing the above business requests. No limitation will be given here in the embodiment of the present disclosure.

For instance, in some examples, the log data may be divided into multiple levels, for example, including error level log data, warn level log data, and info level log data. For instance, the error level log data includes error events that may still allow an application to continue to run; the warn level log data includes potentially harmful locations; and the info level log data includes coarse-grained information events in the running process of the application. It should be noted that the log data may also include debug level log data and fatal level log data. For instance, the debug level log data includes fine-grained information events useful for debugging applications, the level of the debug level log data is lower the level of the info level data; and the fatal level log data includes very serious error events that may cause the application to be terminated, the level of the fatal level log data may be higher than the level of the error level log data and the warn level log data. No limitation will be given here in the embodiment of the present disclosure.

For instance, in some embodiments of the present disclosure, the error level log data, the warn level log data and the info level log data may be only collected, so the amount of the log data can be reduced by only collecting log data in corresponding levels, and then the working efficiency and the accuracy of the system can be improved.

Figure 2:
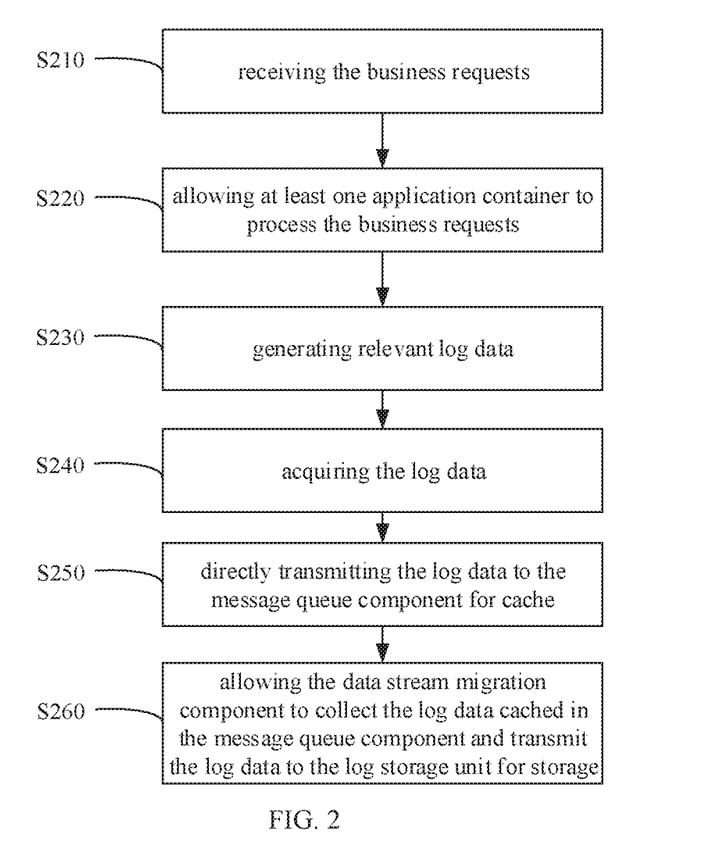
FIG. 2 is a flowchart of another log data collection method provided by at least one embodiment of the present disclosure.

For instance, in some examples, as shown in FIG. 2, the step S110 may include the steps S210 to S240.

S210: receiving the business requests.

For instance, the business requests may be problems received by the intelligent Q&A system, for example, what is the weather today, what time is it, etc. For instance, the amount of the intelligent Q&A system is not limited to be one and may include a plurality of intelligent Q&A system. The log data collection method can simultaneously collect log data generated by the plurality of intelligent Q&A systems.

S220: allowing at least one application container to process the business requests.

For instance, the at least one application container outputs answers of corresponding problems in response to the business requests. For instance, different types of business requests are processed in different docker containers, and these different docker containers are created based on different images. For instance, as shown in FIG. 3, according to different business requests that are processed, the docker containers may be divided into general type docker containers, art type docker containers, etc. Correspondingly, the log data generated by the docker containers is the general type log data, the art type log data, etc. It can be set according to actual situations. No limitation will be given here in the embodiment of the present disclosure.

S230: generating relevant log data.

For instance, in the process of allowing the at least one application container to process the business requests, multiple log data, such as user identification information, user problem information and device information will be generated, and the multiple log data may be divided into the above types and levels, so the log data can be correspondingly stored based on the types and the levels, and then the log data can be processed and called in the subsequent processing processes.

S240: acquiring the log data.

For instance, corresponding log data may be acquired as required. For instance, as described above, the error level log data, the warn level log data and the info level log data in various levels of the log data may be only acquired to reduce the processing amount of the log data and improve the processing efficiency of the log data.

For instance, in some examples, the above log data may be divided into log data that does not need to be perpetually stored and log data that needs to be perpetually stored according to actual demands For instance, in some examples, the log data that does not need to be perpetually stored generated in the application container environment may be transmitted to the log cache unit for cache, and the log data that needs to be perpetually stored is stored in the form of file, or both may be cached through the log cache unit. It can be set according to actual demands. No limitation will be given here in the embodiment of the present disclosure. For instance, whether it needs to store multiple copies is determined according to the importance of the log data or actual needs. For instance, in some examples, very important log data may include error level log data and warn level log data, for example, may be used for problem tracking, error judgment, etc. For instance, relatively unimportant log data may include debug level log data or info level log data. For instance, in some embodiments, relatively important log data may be stored in, for example, two copies as required. One of the two copies is transmitted to the log cache unit for cache and the other one of the two copies is stored in the form of file, for example, stored in a fast drag machine, a hard disk, etc.

For instance, in some examples, the log data that needs to be perpetually stored may include various levels of log data, such as, error level log data, warn level log data, etc. The log data that does not need to be perpetually stored also includes various levels of log data, such as, the log data of which the level is higher than the info level (e.g., error level log data, warn level log data, and info level log data), for example, being used for subsequent text analysis, etc. It can be set according to actual demands No limitation will be given here in the embodiment of the present disclosure. It should be noted that log data that needs to be transmitted and stored may be determined according to actual demands, for example, may also include debug level log data or fatal level log data. No limitation will be given here in the embodiment of the present disclosure.

For instance, after acquiring the above log data, the subsequent steps S120 and S130 are subsequently executed.

For instance, a log acquisition unit configured to acquire the log data may be provided, and the log acquisition unit is adopted to acquire the log data generated by the at least one container in the application container environment. For instance, the log acquisition unit may be implemented by a CPU, a GPU, a TPU, an FPGA or other types of processing units having data processing capacity and/or instruction execution capability and corresponding computer instructions.

As for the step S120, for instance, in the example, the log data is transmitted to the log cache unit for cache in the form of data stream, and is not directly transmitted to, for example, the fast drag machine for storage in the form of file, so as to avoid the phenomenon of resource competition, thereby avoiding the problems, such as the incomplete storage of the log data generated in a highly concurrent environment.

For instance, in some examples, the log cache unit includes a message queue component. For instance, in the example, the step S120 may be specifically implemented as the step S250 as shown in FIG. 2: directly transmitting the log data to the message queue component for cache.

For instance, the message queue component is a distributed message queue component, for example, may be implemented through a kafka component, which is not limited in the embodiment of the present disclosure. For instance, the distributed message queue component includes a plurality of different message queues, for example, including a first message queue, a second message queue, . . . , and an $N^{th}$ (N is an integer greater than 2) message queue. The first message queue, the second message queue, . . . , and the Nth message queue are different message queues, for example, message queues of different topics.

For instance, according to the log type of the log data, log data of different log types may be respectively sent to different message queues in the message queue component for cache. For instance, as shown in FIG. 3, the general type log data generated by the above general type docker container is sent to the first message queue in the message queue component for cache; and the art type log data generated by the above art type docker container is sent to the second message queue in the message queue component for cache. Therefore, the orderly transmission of the data stream can be realized based on the concurrent throughput of the message queue component.

Brief introduction will be given below to the structure and the operation mode of the message queue component. It should be noted that the embodiment of the present disclosure is not limited to the following introduction, and may also adopt other structures and operation modes in the field. No limitation will be given here in the embodiment of the present disclosure.

For instance, the message queue component may be implemented as a distributed message system which is distributed, partition-based, multiple-replica, and based on a coordination mechanism, such as zookeeper, and the maximum characteristic of the message queue component is to process a large amount of data in real time to meet various demand scenarios. For instance, classification is made to messages according to topics in the case where the message queue component stores the messages; a message sender is called a producer; and a message receiver is called a consumer. A message queue cluster includes multiple message queue examples, and each message queue example is called a broker. No matter the message queue cluster or the producer and the consumer depend on zookeeper to guarantee system availability.

The publishing and subscribing object in the message queue component is the message queue under the topic. One topic may be created for each type of log data; a client that publishes messages to the message queues of multiple topics is called producer; and a client that subscribes messages from the message queues of multiple topics is called consumer. The producer and the consumer can simultaneously read and write data from the message queues of multiple topics. One message queue cluster includes one or more brokers (for example, servers) and is responsible for persisting and backing up specific queue messages.

For instance, machine/service in the message queue cluster is called the broker. One node in the message queue component is one broker, and a message queue cluster includes a plurality of brokers. It should be noted that one node may include a plurality of brokers. The amount of the brokers on one machine is determined by the amount of the servers.

For instance, the topic represents a type of message, and a directory where messages are stored is the topic. For instance, page view log, click log and the like can all exist in the form of topic. The message queue cluster can simultaneously be responsible for the distribution of messages in the message queues of multiple topics. One broker may include a plurality of topics.

For instance, the partition represents physical group of the topic; one topic may be divided into a plurality of partitions; and each partition is an orderly queue. In the process of generating and consuming the log data, there is no need to pay attention to which broker the specific storage partition is on, only needing to specify the topic. The message queue component is responsible for associating the log data with the corresponding partition.

For instance, the message represents the transferred data object, and mainly includes four parts: an offset, a key, a value, and insertion time. For instance, the log data in the embodiment of the present disclosure is the message.

For instance, the producer generates the messages and sends the messages to the message queues of corresponding topics.

For instance, the consumer subscribes the topic and consumes the messages stored in the message queue of the topic, and the consumer consumes as a thread.

For instance, one consumer group includes a plurality of consumers, which is pre-configured in a configuration file. Various consumers (consumer threads) may be combined into one consumer group. Each message in the partition can only be consumed by one consumer (consumer thread) in the consumer group. If one message can be consumed by a plurality of consumers (consumer threads), these consumers must be in different groups. The message queue component only allows one consumer thread to access one partition in order to guarantee the throughput. If the efficiency is not high, horizontal expansion can be realized by increasing the amount of the partitions, and then new consumer threads are added for consumption, so the horizontal expandability is given full play, and the throughput is extremely high, which forms the concept of distributed consumption.

For instance, one message queue cluster includes a plurality of producers (may be PageView and server log generated by the web front end or a CPU, a memory and the like of the system), a plurality of brokers (the message queue component supports horizontal expansion, and in general, in the case where the amount of brokers is larger, the throughput of the cluster is higher), a plurality of consumer groups, and one Zookeeper cluster. The message queue component manages the cluster configuration through the Zookeeper and selects a decider; and rebalance operations are performed when the consumer group changes. The producer uses a push mode to release the messages to the broker, and the consumer uses a pull mode to subscribe and consume the messages from the broker.

The process from the producer to the broker is the push operation, namely data is pushed to the broker. The process from the consumer to the broker is the pull operation, namely the consumer actively pulls the data, but not the case that the broker actively sends the data to the consumer.

As for the step S130, for instance, in some examples, the log collection unit includes a data stream migration component. For instance, the data stream migration component includes a distributed data stream migration component, for example, large-data extraction-transformation-loading (ETL) component, such as, a flume component and the like. It should be noted that the log collection unit only needs to include an interface component corresponding to the log cache unit. No limitation will be given here in the embodiment of the present disclosure.

For instance, as shown in FIG. 2, the step S130 specifically includes the step S260: allowing the data stream migration component to collect the log data cached in the message queue component and transmit the log data to the log storage unit for storage. As shown in FIG. 3, the log collection unit includes a plurality of data stream migration components, and different data stream migration components are in one-to-one correspondence with the message queues of different topics to respectively collect the log data cached in different message queues. For instance, the log collection unit reads the log data cached in different message queues one by one, so as to collect the log data cached in the log cache unit, that is, the transmission mode of the data stream from the message queue component to the data stream migration component adopts stream transmission.

For instance, the data stream migration component may be implemented as a distributed system, is configured to effectively collect, gather and move a large amount of log data to a centralized data storage area from multiple different sources (for example, the message queue component), and is a tool/service or a data concentration mechanism that can collect data resources, such as logs and events and centralize and store these huge amounts of log data from various data resources.

For instance, an external structure of the data stream migration component may include a data generator. The log data generated by the data generator (such as the message queue component) is collected by a single agent running on a server where the data generator is located, and subsequently, a data sink collects the log data from various agents and stores the collected log data into the log storage unit.

For instance, the inside of the data stream migration component includes one or more agents. However, each agent is an independent daemon (JVM), and receives the log data from the client (e.g., the message queue component) or receives the log data from other agents, and then quickly transmits the acquired log data to the next destination node, for example, the sink, the log storage unit, or a next agent.

For instance, the agent mainly includes three components: a source, a channel, and a sink. For instance, the source receives the log data from the data generator and transmits the received log data to one or more channels. For instance, the channel is an ephemeral storage container, caches the log data received from the source until the data is consumed by the sink, and acts as a bridge between the source and the sink. The channel is a complete transaction, which ensures the consistency of the data in the sending and receiving processes, and may be connected with any amount of sources and sinks. For instance, the type of the channel includes: JDBC channel, File System channel, Memort channel, etc. For instance, the sink stores the log data into, for example, the log storage unit, consumes the log data from the channel, and transmits the log data to the destination. For instance, the destination may be another sink and may also be the log storage unit. For instance, the data stream migration component may be implemented as a flume component.

For instance, in some examples, the log storage unit includes a large-data storage platform, for example, including a distributed file system (e.g., a hadoop distributed file system (HDFS), a database (e.g., a hadoop database (HBase)), or other common files (e.g., Windows files, linux files, etc.). No limitation will be given here in the embodiment of the present disclosure.

For instance, the process of transmitting the log data to the log storage unit for storage includes: transmitting the log data collected by the data stream migration component to the distributed file system for distributed storage. For instance, the log data in different data stream migration components is stored on different distributed file systems.

For instance, the log data is transmitted to the log storage unit (e.g., the distributed file system) for storage based on system time and in accordance with a first time range. For instance, the system time may be the time on the machine or system that executes the log data processing method. For instance, in some examples, folders and files can be created according to topic, year, month, day, and the first time range (for example, some specific time ranges, e.g., 00:00-12:00, 12:00-24:00, etc.), so as to store the log data corresponding to certain topic and time in corresponding file or folder, thereby realizing the distributed storage of the log data, which is favorable for the processing of the log data within corresponding range in the subsequent steps.

For instance, in some examples, after the log data is stored into the log storage unit, the log data collection method further comprises: processing the log data stored into the log storage unit, so as to ensure the accuracy and the practicability of the stored log data.

Figure 4:
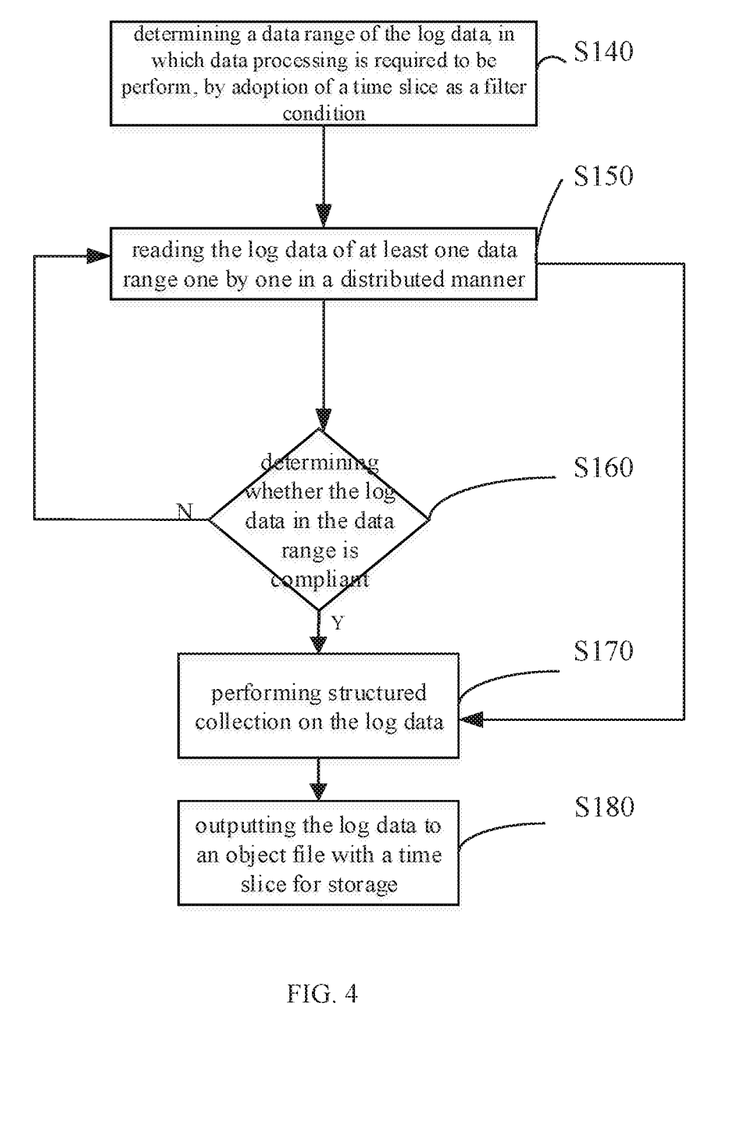
FIG. 4 is a flowchart illustrating a data processing operation provided by at least one embodiment of the present disclosure.

FIG. 4 is a flowchart illustrating data processing provided by at least one embodiment of the present disclosure. As shown in FIG. 4, the data processing operation includes the steps S140 to S180. Detailed description will be given below to the data processing operation provided by at least one embodiment of the present disclosure with reference to FIG. 4.

S140: determining a data range of the log data, in which data processing is required to be perform, by adoption of a time slice as a filter condition.

For instance, a time slice represents a time range. For instance, one time range is set according to actual demands to filter out log data in the time range for subsequent data processing. For instance, the time slice may include the range of one first time range, that is, the time slice is one first time range (e.g., 00:00-12:00), so as to filter the log data in the first time range for processing. Of course, the time slice may also include the range of multiple first time ranges, that is, the range of the time slice covers multiple first time ranges (for example, 00:00-24:00 covers two first time ranges), so as to filter the log data in the multiple first time ranges for processing.

S150: reading the log data of at least one data range one by one in a distributed manner.

For instance, at least one data range can be acquired based on different time slices in the step S140. For instance, the log data in the at least one data range may be respectively and simultaneously performed data processing. For instance, the log data in each data range is respectively read one by one, so as to process the read log data one by one. For instance, in some examples, the log data that is read one by one is used for continuously executing the step S160, that is, used for determining whether the log data is compliant, so as to filter out compliant data for the subsequent processes. In some other examples, the log data that is read one by one may be directly used for executing the step S170, namely structured processing. The specific operation steps may be set according to actual conditions. No limitation will be given here in the embodiment of the present disclosure.

S160: determining whether the log data in the data range is compliant, if so, executing the step S170, if not, continuing to execute the step S160 to continuously determine whether a remaining log data is compliant.

For instance, the log data in various distributed file systems may be subjected to data cleansing in the step. For instance, the step of determining whether the log data in the data range is compliant may include: determining whether the format, information (for example, user identification information, user question information, etc.), time and the like of the log data are compliant. No limitation will be given here in the embodiment of the present disclosure. Accurate log data can be filtered out based on the step and used for subsequent data analysis.

S170: performing structured collection on the log data.

For instance, the structured collection process includes: converting log data in, for example, text form into matrix form.

For instance, in the above step, a large-data processing program in the field may be used to clean the newly added log data in the distributed file system according to task schedule.

S180: outputting the log data to an object files with a time slice for storage.

For instance, the log data obtained after structured in the step S180 is stored into an object file corresponding to the time range thereof, so as to finish the distributed storage of the log data.

For instance, the log data after the above data processing is gathered to a result file, and then the relevant calculation of indicators required by reports (for example, Q&A time, Q&A number, etc.) is performed, and calculation results of the indicators required by the reports are displayed in a report display system, for example, Histogram display.

The log data collection method provided by the above embodiment of the present disclosure can solve the problem of the incomplete storage of the log data in a highly concurrent environment, broaden the use environment of the application container, and improve the market competitiveness.

It should be noted that the flow of the log data collection method provided by some embodiments of the present disclosure may include more or less operations. These operations can be executed sequentially or in parallel. Although the flow of the log data collection method described above includes multiple operations occurring in specific sequence, it should be clearly understood that the sequence of the multiple operations is not limited. The log data collection method described above can be executed once and can also be executed in multiple times according to predetermined conditions.

Figure 5:
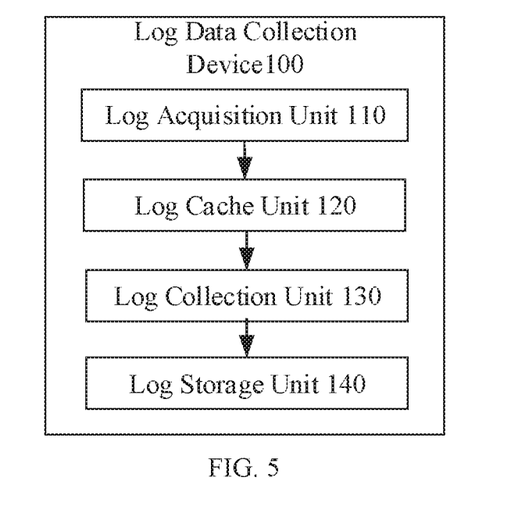
FIG. 5 is a schematic block diagram of a log data collection device provided by at least one embodiment of the present disclosure.

At least one embodiment of the present disclosure further provides a log data collection device. FIG. 5 is a schematic block diagram of a log data collection device provided by at least one embodiment of the present disclosure.

For instance, as shown in FIG. 5, in some examples, a log data collection system 100 comprises a log acquisition unit 110, a log cache unit 120, a log collection unit 130, and a log storage unit 140. For instance, these units may be implemented through a hardware (such as circuit) module, a software module, or any combination thereof.

The log acquisition unit 110 is configured to acquire log data generated by at least one container in an application container environment. For instance, the log acquisition unit 110 can implement the step S110. The specific implementation method may refer to relevant description on the step S110. No further description will be given here.

The log cache unit 120 is configured to cache the log data. For instance, the log cache unit 120 can implement the step S120. The specific implementation method may refer to relevant description on the step S120. No further description will be given here.

The log collection unit 130 is configured to collect the log data cached in the log cache unit 120 and transmit the log data. The log storage unit 140 is configured to store the log data. For instance, the log collection unit 130 and the log storage unit 140 can implement the step S130. The specific implementation method may refer to relevant description on the step S130. No further description will be given here.

For instance, the log cache unit 120 includes a message queue component; the log collection unit 130 includes a data stream migration component; and the log storage unit 140 includes a distributed file system. The specific description may refer to the description in the log data collection method. No further description will be given here.

It should be noted that the log data collection device provided by the embodiment of the present disclosure may include more or less circuits or units, and the connection relationships between the circuits or units is not limited and may be determined according to actual demands The specific structure of the circuits is not limited. The circuit may be composed of analog devices according to the circuit principle, may also be composed of digital chips, or may be formed by other suitable methods.

Figure 6:
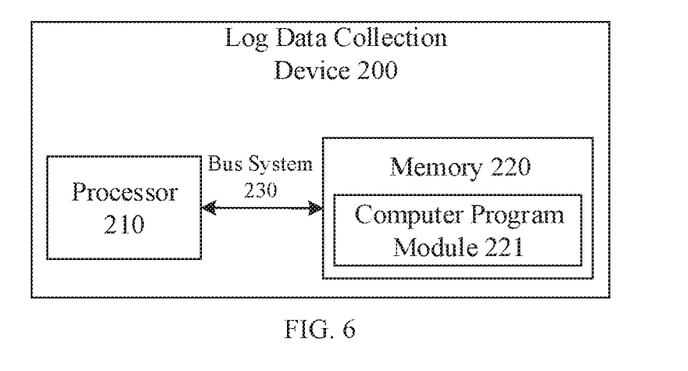
FIG. 6 is a schematic block diagram of another log data collection device provided by at least one embodiment of the present disclosure.

FIG. 6 is a schematic block diagram of another log data collection device provided by at least one embodiment of the present disclosure. As shown in FIG. 6, a log data collection device 200 comprises a processor 210, a memory 220 and one or more computer program modules 221.

For instance, the processor 210 and the memory 220 are connected with each other through a bus system 230. For instance, one or more computer program modules 221 are stored in the memory 220. For instance, one or more computer program modules 221 include instructions used for executing the log data collection method provided by any embodiment of the present disclosure. For instance, the instructions in one or more computer program modules 221 may be executed by the processor 210. For instance, the bus system 2230 may be commonly used serial or parallel communication bus, etc. No limitation will be given here in the embodiment of the present disclosure.

For instance, the processor 210 may be a CPU, an FPGA or processing units in other forms having data processing capability and/or instruction execution capability, may be a general-purpose processor or a dedicated processor, and can control other components in the log data collection device 200 to execute desired functions.

The memory 220 may include one or more computer program products. The computer program products may include various forms of computer readable storage media, such as volatile memories and/or non-volatile memories. The volatile memory, for example, may include a random access memory (RAM) and/or a cache. The non-volatile memory, for example, may include a read only memory (ROM), a hard disk, a flash memory, etc. One or more computer program instructions may be stored on the computer readable storage medium, and the processor 210 may run the program instructions to realize the functions in the embodiment of the present disclosure (implemented by the processor 210) and/or other desired functions, for example, the log data collection method. Various applications and various data, for example, the log data generated in the at least one application container and various data used and/or generated by the application, may also be stored in the computer readable storage medium.

It should be noted that for clarity and conciseness, not all the components of the log data collection device 200 are given in the embodiment of the present disclosure. In order to realize necessary functions of the log data collection device 200, those skilled in the art can provide and set other components not shown according to specific demands No limitation will be given here in the embodiment of the present disclosure.

The technical effects of the log data collection device 100 and the log data collection device 200 in different embodiments may refer to the technical effects of the log data collection method provided by the embodiment of the present disclosure. No further description will be given here.

Figure 7:
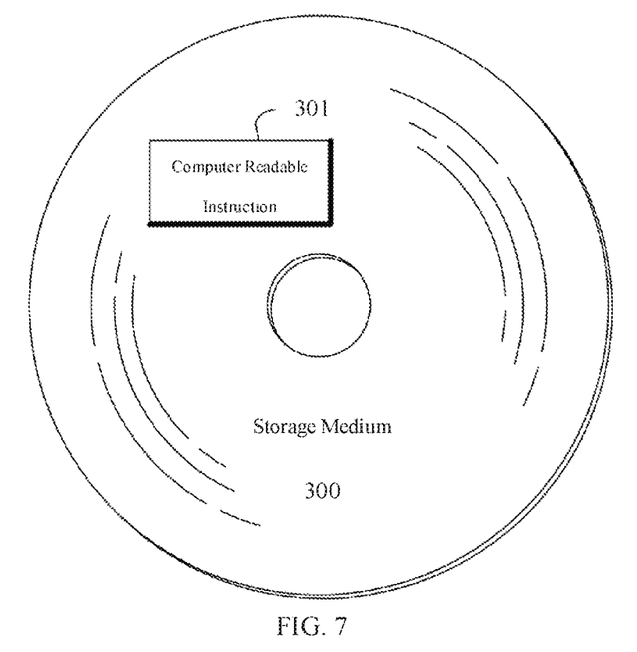
FIG. 7 is a schematic diagram of a storage medium provided by at least one embodiment of the present disclosure.

Some embodiments of the present disclosure further provide a storage medium. FIG. 7 is a schematic diagram of a storage medium provided by at least one embodiment of the present disclosure. For instance, a storage medium 300 stores computer readable instructions 301 non-transitorily. The log data collection method provided by any embodiment of the present disclosure can be executed in the case where the computer readable instructions 310 are executed by a computer (including a processor).

For instance, the storage medium may be any combination of one or more computer readable storage media. For instance, one computer readable storage medium includes computer readable program codes that cache the log data, and another computer readable storage medium includes program codes that collect the log data. For instance, in the case where the program code is read by the computer, the computer can execute the program code stored in the computer storage medium, for example, executing the log data collection method provided by any embodiment of the present disclosure.

For instance, the program code may be used by an instruction execution system, device or element or a combination thereof. The program codes included on the computer readable storage medium may be transmitted by any appropriate medium, including but not limited to: wire, optical cable, radio frequency (RF) or the like, or any appropriate combination thereof.

For instance, the storage media may include memory cards for smartphones, storage components for tablets, hard disks for personal computers, RAMs, ROMs, erasable programmable read-only memories (EPROMs), portable compact disk read-only memories (CD-ROMs), flash memories, or any combination of the above storage media, and may also be other suitable storage media.

The technical effects of the storage medium provided by the embodiment of the present disclosure may refer to corresponding description on the log data collection method in the above embodiment. No further description will be given here.

Figure 8:
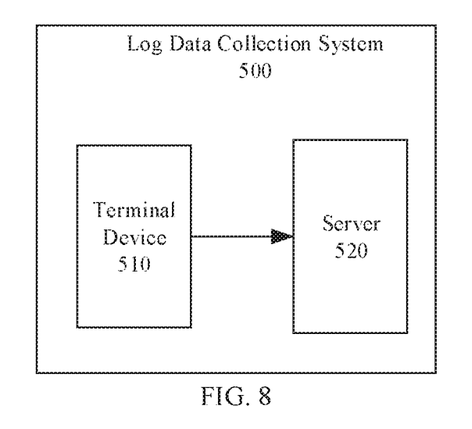
FIG. 8 is a schematic diagram of a log data collection system provided by at least one embodiment of the present disclosure.

At least one embodiment of the present disclosure further provides a log data collection system. As shown in FIG. 8, the log data collection system 500 comprises a terminal device 510 and a server 520.

For instance, the terminal device 510 is configured to receive audio or text information and send the audio or text information to the server 520. For instance, the terminal device may be an electronic device, such as an electronic picture frame. For instance, the terminal device will be introduced in detail in FIG. 9. No further description will be given here.

For instance, the server 520 is configured to receive the audio or text information sent by the terminal device 510, generate the log data, and collect the log data based on the log data collection method provided by any embodiment of the present disclosure.

For instance, in some examples, the audio or text information includes general type audio or text information and art type audio or text information, and the server 520 includes a general type application container, an art type application container, a message queue component, a data stream migration component, and a distributed file system. For instance, the general type application container is configured to output the general type log data in response to the general type audio or text information; the art type application container is configured to output the art type log data in response to the art type audio or text information; the message queue component is configured to cache the general type log data and the art type log data; the data stream migration component is configured to collect the general type log data and the art type log data cached in the message queue component and transmit the log data; and the distributed file system is configured to store the general type log data and the art type log data. For instance, the general type application container, the art type application container, the message queue component, the data stream migration component, the distributed file system and the like may refer to the specific description on the above log data collection method. No further description will be given here.

For instance, the message queue component includes message queues of general type topics and message queues of art type topics. The general type log data is cached in the message queues of general type topics, and the art type log data is cached in the message queues of art type topics. For instance, the server 520 is also configured to determine whether the general type log data and the art type log data stored on the distributed file system are compliant based on a first principle. For instance, the first principle may be set according to the turn-on time of the electronic picture frame, the screen orientation of the electronic picture frame, or the volume of the electronic picture frame. For instance, in the process of determining the turn-on time of the electronic picture frame, the first principle may be set to be 2019, that is, the log data is not compliant when the turn-on time displays 2099. For instance, the first principle may be set to be horizontal screen and vertical screen included in the electronic picture frame, so the log data is not compliant when an oblique screen is displayed. Moreover, for instance, the first principle may be set to be that the volume of the electronic picture frame is 0-100, namely the log data is not compliant when the volume displays 300. No limitation will be given here in the embodiment of the present disclosure.

Figure 9:
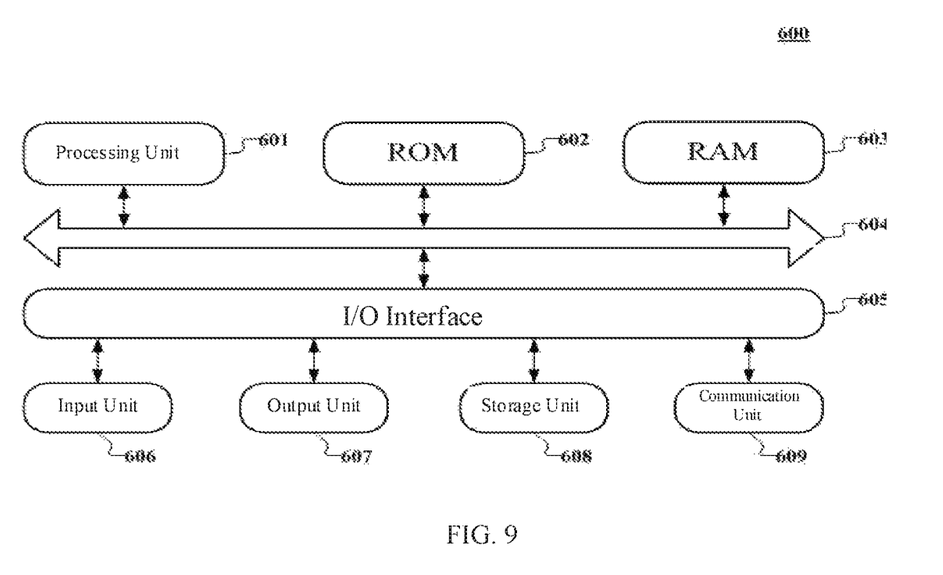
FIG. 9 is a schematic diagram of a terminal device provided by at least one embodiment of the present disclosure.

At least one embodiment of the present disclosure further provides a terminal device applying the above log data collection method. FIG. 9 is a schematic diagram of a terminal device provided by at least one embodiment of the present disclosure. As shown in FIG. 9, a terminal device 600 (the server or the terminal device as described above) may include, but not limited to, a mobile terminal, such as an electronic picture frame, a mobile phone, a notebook computer, a digital broadcast receiver, a personal digital assistant (PDA), a PAD, a portable multimedia player (PMP), a car terminal (e.g., a car navigation terminal), and a fixed terminal, such as a digital TV and a desktop computer. The terminal device as shown in FIG. 9 is only one example. No limitation will be given here in the embodiment of the present disclosure.

As shown in FIG. 9, the terminal device 600 may include a processing unit (such as a CPU or a GPU) 601, which can execute appropriate actions and processing, for example, the above log data collection method, according to programs stored in an ROM 602 or programs loaded to an RAM 603 from a memory 608. The RAM 603 also stores various programs and data required by the operation of the terminal device 600. The processing unit 601, the ROM 602 and the RAM 603 are connected with each other through a bus 604. An input/output (I/O) interface 605 is also connected to the bus 604.

For instance, units connected to the I/O interface 605 include: an input unit 606 including, for example, a touch screen, a touch pad, a keyboard, a mouse, a camera, a microphone, an accelerometer, and a gyroscope; an output unit 607 including, for example, a liquid crystal display (LCD), a loudspeaker, and a vibrator; a storage unit 608 including, for example, a tape, a hard disk, etc.; and a communication unit 609. The communication unit 609 may allow the terminal device 600 to be in wired or wireless communication with other devices. Although FIG. 9 shows the terminal device 600 including various units, it should be understood that it is not required to implement or include all of the devices shown, but it can alternatively implement or include more or fewer devices.

For instance, in the embodiment of the present disclosure, the processes described above with reference to the flowchart can be implemented as computer software programs. For instance, the embodiment of the present disclosure provides a computer program product, which comprises computer programs loaded on, for example, the storage medium as shown in FIG. 7. The computer programs contain program codes used for executing the method as shown by the flowchart. In the embodiment, the computer programs may be downloaded and installed from the network via the communication unit 609, or installed from the storage unit 608, or installed from the ROM 602. When the computer programs are executed by the processing unit 601, the above functions defined in the log data collection method provided by the embodiment of the present disclosure are executed. For instance, the above storage medium may be included in the above-mentioned terminal device, and may also exist alone without being assembled into the terminal device.

For instance, in some embodiments, the terminal device and the server can utilize any currently known or future-developed network protocol, such as a HyperText Transfer Protocol (HTTP) for communication, and can be interconnected with any form or medium of digital data communication (e.g., communication network). Examples of the communication networks include local area network ("LAN"), wide area network ("WAN"), the Internet, and end-to-end network (e.g., ad hoc end-to-end network), as well as any currently known or future research and development network.

The technical effects of the log data collection system provided by the embodiment of the present disclosure may refer to corresponding description on the log data collection method in the above embodiments. No further description will be given here.

The following statements need to be noted.

(1) The drawings of the embodiments of the present disclosure involve only the structures related to the embodiments of the present disclosure, and other structures may be referred to general design.

(2) In case of no conflict, the embodiments of the present disclosure and the features in the embodiments can be combined with each other to obtain new embodiments.

What have been described above merely are specific implementations of the present disclosure, but the protection scope of the present disclosure is not limited to this. The protection scope of the present disclosure is determined by the appended claims.

The invention claimed is:

1. A log data collection method, comprising:
  acquiring log data generated by at least one container in an application container environment;
  transmitting the log data to a log cache unit for cache; and
  allowing a log collection unit to collect the log data cached in the log cache unit and transmit the log data to a log storage unit for storage;
  the log cache unit comprises a message queue component; the log collection unit comprises a plurality of data stream migration components; and
  the log data collection method comprises:
  transmitting the log data to the message queue component for cache, comprising respectively sending log data of different log types to different message queues in the message queue component for cache according to log types of the log data; and allowing the data stream migration components to collect the log data cached in the message queue component and transmit the log data to the log storage unit for storage,
  wherein different data stream migration components of the plurality of data stream migration components are in one-to-one correspondence with the different message queues which respectively receiving the log data of different log types, so as to respectively collect the log data cached in the different message queues.

2. The log data collection method according to claim 1, wherein allowing the log collection unit to collect the log data cached in the log cache unit, comprises:

allowing the log collection unit to read the log data cached in the different message queues one by one, so as to collect the log data cached in the log cache unit.

3. The log data collection method according to claim 1, wherein the log data comprises error level log data, warn level log data, and info level log data.

4. The log data collection method according to claim 1, wherein the log data is transmitted to the log storage unit for storage based on system time and in accordance with a first time range.

5. The log data collection method according to claim 1, wherein the log storage unit comprises a distributed file system; and
transmitting the log data to the log storage unit for storage, comprises:
transmitting the log data collected by the log collection unit to the distributed file system for distributed storage.

6. The log data collection method according to claim 1, further comprising:
performing data processing on the log data stored into the log storage unit.

7. The log data collection method according to claim 6, further comprising:
determining a data range of the log data, in which data processing is required to be performed, by adoption of a time slice as a filter condition; and
determining whether the log data within the data range is compliant, if so, performing structured collection on the log data, and outputting the log data to an object file with the time slice for storage.

8. The log data collection method according to claim 7, wherein determining whether the log data within the data range is compliant, comprises:
reading log data of at least one data range one by one in a distributed manner, so as to determine whether the log data in the at least one data range is compliant.

9. The log data collection method according to claim 1, wherein the log data is log data generated by an intelligent question and answer (Q&A) system.

10. The log data collection method according to claim 9, wherein types of the log data comprises a first type log data and a second type log data;
the first type log data is sent to a first message queue in the message queue component for cache; and
the second type log data is sent to a second message queue in the message queue component for cache; and
the first message queue is different from the second message queue.

11. The log data collection method according to claim 10, wherein the first type log data is log data generated based on a general type Q&A; and the second type log data is log data generated based on an art type Q&A.

12. The log data collection method according to claim 9, wherein the application container environment comprises the at least one container; the intelligent Q&A system comprises a natural language understanding (NLU) subsystem; the NLU subsystem runs on the at least one container of the application container environment and generates the log data; and
the at least one container outputs the log data in response to a business request.

13. The log data collection method according to claim 12, wherein the application container environment comprises a plurality of containers, and different business modules of the NLU subsystem runs in different containers.

14. The log data collection method according to claim 1, wherein the application container environment is implemented through a docker container engine.

15. A log data collection device, comprising:
a processor; and
a memory configured to store one or more computer program modules,
wherein the one or more computer program modules are configured to be executed by the processor and comprise instructions used for executing a log data collection method, which comprising:
acquiring log data generated by at least one container in an application container environment;
transmitting the log data to a log cache unit for cache; and
allowing a log collection unit to collect the log data cached in the log cache unit and transmit the log data to a log storage unit for storage;
the log cache unit comprises a message queue component;
the log collection unit comprises a plurality of data stream migration components; and
the log data collection method comprises:
transmitting the log data to the message queue component for cache, comprising respectively sending log data of different log types to different message queues in the message queue component for cache according to log types of the log data; and
allowing the data stream migration components to collect the log data cached in the message queue component and transmit the log data to the log storage unit for storage, wherein different data stream migration components of the plurality of data stream migration components are in one-to-one correspondence with the different message queues which respectively receiving the log data of different log types, so as to respectively collect the log data cached in the different message queues.

16. A storage medium, used for non-transitory storage of computer readable instructions, wherein the log data collection method according to claim 1 can be executed in a case where the computer readable instructions are executed by a computer.

17. A log data collection system, comprising a terminal device and a server,
wherein the terminal device is configured to receive audio or text information and send the audio or text information to the server; and
the server is configured to receive the audio or text information sent by the terminal device, generate log data, and collect the log data based on a log data collection method, which comprising:
acquiring log data generated by at least one container in an application container environment;
transmitting the log data to a log cache unit for cache; and
allowing a log collection unit to collect the log data cached in the log cache unit and transmit the log data to a log storage unit for storage;
the log cache unit comprises a message queue component;
the log collection unit comprises a plurality of data stream migration components; and
the log data collection method comprises:
transmitting the log data to the message queue component for cache, comprising respectively sending log data of different log types to different message queues in the message queue component for cache according to log types of the log data; and
allowing the data stream migration components to collect the log data cached in the message queue component and transmit the log data to the log storage unit for storage, wherein different data stream migration components of the plurality of data stream migration components are in one-to-one correspondence with the different message queues which respectively receiving the log data of different log types, so as to respectively collect the log data cached in the different message queues.

18. The log data collection system according to claim 17, wherein the audio or text information comprises general type audio or text information and art type audio or text information; the server comprises a general type application container, an art type application container, a message queue component, a data stream migration component, and a distributed file system;

the general type application container is configured to output general type log data in response to the general type audio or text information;

the art type application container is configured to output art type log data in response to the art type audio or text information;

the message queue component is configured to cache the general type log data and the art type log data;

the plurality of data stream migration components are configured to collect and transmit the general type log data and the art type log data cached in the message queue component; and the distributed file system configured to store the general type log data and the art type log data.

* * * * *